Patented Dec. 15, 1953

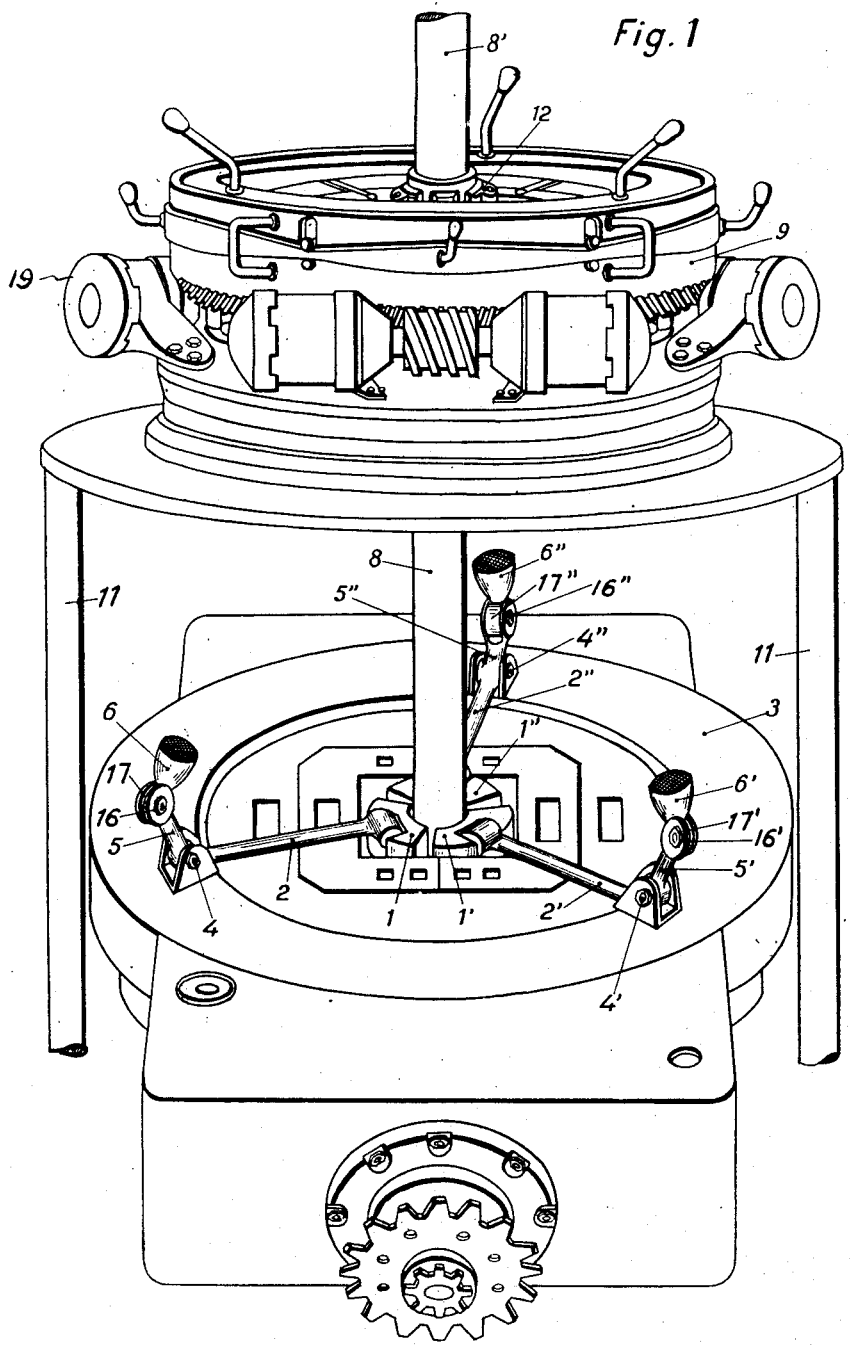

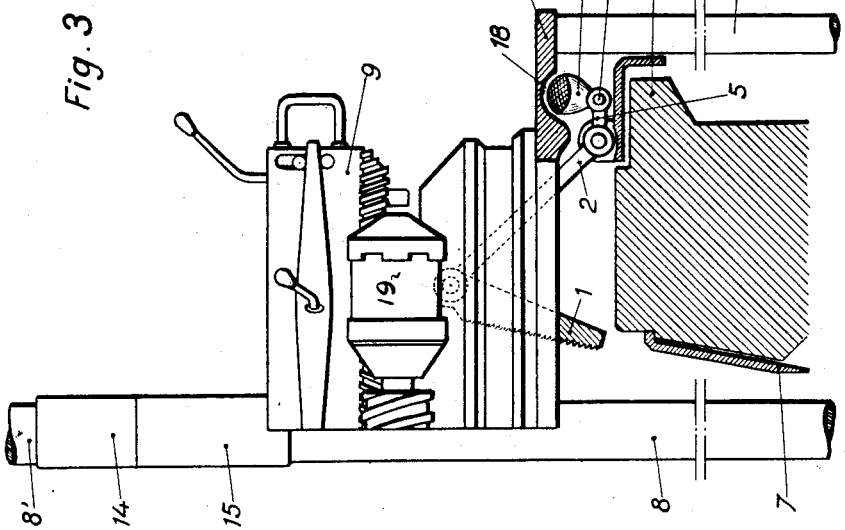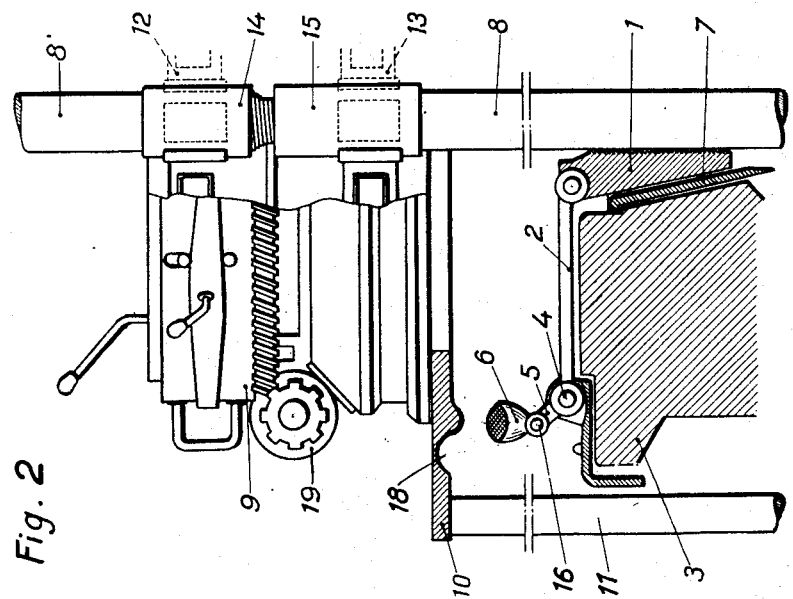

2,662,737

UNITED STATES PATENT OFFICE 2,662,737

AUTOMATIC CONTROL OF SLIPS OF DRILL PIPE STRINGS OF SOUNDING HOLES

Vladimir Edelberg, Tunis, Tunisia

Application January 31, 1947, Serial No. 725,422

2 Claims. (Cl. 255—23)

The present invention has relation to deep well equipment and more particularly to the elevating mechanism whereby the tube or casing is lowered into the well or hoisted therefrom according to requirements.

In the sounding bore hole industry various pipes, such as drill-pipe strings and well tube casings must be installed and removed from the well. Such pipes or tubes consist of joints which are connected together by couplings, and as the pipes are installed in or removed from the well, they must be either screwed together or disconnected. For the purpose of supporting the pipe during the making or breaking of a joint, it is common practice to employ slips resting in a conical seat. Usually, said conical seat is provided by a spider (or other suitable body such as a rotary table of a rotary machine). Commonly two, three or four slips are used in supporting a pipe. During the time a pipe is raised or lowered so that another joint may be made or broken, the slips are withdrawn from their conical seat. At the present time several operators are required to place and to withdraw said slips.

Heretofore it has been proposed to simplify the respective operations by arranging a set of two arm levers surrounding said conical slip seat and being pivotally connected to a part wherein said conical seat is secured. The slips are hinged at the inner ends of horizontal arms of said levers so as to be placed or withdrawn according to the respective movements of said levers. In this manner the slips may be allowed to wedge down and will then support said drillpipe stem, so that the portion of the stem above the slips may be unscrewed and lifted free for the insertion or withdrawal of an intermediate pipe or tube section.

Notwithstanding, all these labor saving slip control devices were operated manually, quite independently from the other functions of the drilling apparatus.

To avoid any untimely withdrawing of the slips, special means have been devised comprising a special heavy table with a central aperture surrounding the drill-pipe string, said string being suspended therein; said table, if lowered, compressing a spring controlled slip operating device so as to prevent the fall of the lower part of the tubing or piping into the well, when its part above the slips ceases to be supported by the hoisting or other suspending gear provided in the derrick. The disadvantage of these devices consists in the feature that screwing and unscrewing operations of the piping or tubing may be effected quite independently, and without regard to the actual positions of the slips, nothing being provided to avoid an untimely disconnecting and falling of their lower parts into the well.

The object of the present invention is to create means tending to obviate any disconnecting operation on the upper part of the piping or tubing so long as the complete safety of its lower part is not ascertained by wedging the slips in their working positions within the said conical seat. It aims especially at the conjointed use of the new automatic slip control device with the tongs for pipe joints, for instance automatic tongs (according to the copending application of applicant, filed January 31st, 1947, under Serial No. 725,421, now Patent No. 2,566,561, issued September 4, 1951), so that the latter ordinarily will not be operated so long as the slips are not firmly wedged, and reciprocally the slips ordinarily will not be withdrawn so long as the platform with the screwing tongs is in a raised position.

To this end one feature of the present invention embraces a combination comprising a table with a central aperture to receive the drill pipe string, slips surrounding the same, each of these slips hanging on the end of a horizontal arm of a bell-crank lever pivotally secured to said table, the other arm of said lever being shorter and ordinarily held in a more or less upright position, and a platform superposed above the said table, said platform carrying the tongs to make and break the pipe or tube joints. Ordinarily said platform reposes with all its weight upon the shorter arms of said lever, keeping the slips withdrawn from their seats so as to enable the drill-pipe string to be displaced or rotated freely. However, in this position all screwing and unscrewing means carried by the platform are immobilized and remain inoperative, whereas on lifting the platform, the levers being freed, the slips drop down into their respective seats to secure fixedly the drill-pipe string and immobilizing it for the entire time when the platform is hoisted in its raised position.

Other objects and advantages of the invention will become evident in the ensuing description, the same being taken in connection with the accompanying drawings.

While the drawings illustrate an embodiment of the present invention, it is to be undertsood that in adapting the same to meet different conditions and requirements, various changes in the shape, proportion and minor details of construction may be resorted to without departing from the spirit of the invention.

In the drawings chosen for the purpose of illustrating the present invention, the scope whereof is pointed out in the following description and claims, Fig. 1 shows a perspective view of the appliance as a whole.

Fig. 2 represents a semi-sectional view of the tongs device in its operative position, the slips gripping the drill-pipe string.

Fig. 3 is a semi-sectional view of the platform with the screwing apparatus in its inoperative position, the slips wedged on the drill-pipe string.

Like symbols refer to like parts wherever they may occur.

In the drawings, the three slips 1, 1', 1'', are respectively attached to the inner ends of the long horizontal arms 2, 2', 2'' of the bell crank lever. These are pivotally fixed on the rotary table 3 at 4, 4' and 4''. The ends of the short, more or less upright arms 5, 5', 5'' are provided with cushions 6, 6', 6'', pivoted thereon by means of axles 16, 16', 16'', provided with springs 17, 17' and 17''. The slips 1, 1' and 1'' engage within a convenient recess or seat within the table 3, e. g., in a ring 7 with a conical aperture so as to clamp the pipe 8 of the drill-pipe string.

The screwing and unscrewing tongs for pipe and tube joints according to the abovementioned copending application are shown at 9. To understand the operation here it will suffice, without it being necessary to describe them again, to state that they are substantially constituted in the following manner. On a platform 10, which can be operated vertically by hydraulic pistons 11, are arranged two rings carrying internally mobile jaws 12—13, (Fig. 2). These jaws can be pressed, with the aid of hand-levers on to the two parts 14, 15 of a joint. Electric motors 19, secured to the lower jaw-ring on which they rest, make the upper jaw-ring turn to screw or unscrew the joint 14—15. When the jaws 12, 13 are withdrawn from the joint, there exists in the center of the tongs an empty space of a diameter 500–700 cm.

The functioning of the slip opening device is as follows:

At the beginning of the running-in trip the pipe 8 is clamped between the slips 1, the block is then unhooked, the upper joint 15 of the pipe 8 is about 1 meter above the rotary table 3, and the tongs 9 are at the level of the joint. A further pipe 8' already being suspended to the block, is then screwed to the string that has in the meanwhile been clamped by the slips, the screwing being done by the tong mechanism. The joint having been made, the tong mechanism is untightened and the tong carrying platform 10 is lowered so as to engage, at the recess 18, the cushions 6 of the shorter lever arms 5 and to press them down into the position as shown in Fig. 3. By this action the more or less horizontal longer lever arms are lifted to withdraw the slips 1 attached thereto. They leave their conical seat 7 remain within the central cavity of the platform for the entire operation of the drill-pipe string. The platform 10 carrying the tongs is situated at that moment about 5 cm. above the rotary table, and as the height of the tongs does not surpass 30 to 40 cm., the joint 14—15, the middle of which is at about 1 m. above the table, is completely clear of the tongs.

To hoist the drill-pipe string, the platform 10 is lifted into the position as shown in Fig. 2, level with the joint 14—15, the slips dropping back into their conical seat 7. The action of the block ceasing, the slips will automatically wedge the string. Upon unscrewing the joint and removal of the second pipe 8', the platform 10 may be lowered again so as to touch the cushions 6 and to withdraw the slips. In this position the upper end 15 of the pipe 8 is sufficiently above the tongs so as to enable the hoisting gear to be fixed thereto, and to lift the entire drill-pipe string into a position where the next pipe 8 may be disconnected therefrom.

As is evident, the automatic slip control device above described is very simple, and if operated in conjunction with the screwing and unscrewing appliance according to the previously mentioned application, special control means (as they are required if operating a derrick of actual design) may be avoided without any danger of a premature opening of the slips.

What I claim is:

1. In an automatic slip control appliance of drill-pipe strings for sounding holes, a combination comprising a rotary table with a central aperture for the passage of said pipe string and a conical seat arranged coaxially thereto to receive said drill-pipe string, a plurality of slips disposed around said string and lodged within said conical seat, bell-crank levers to support said slips and having their bends pivotally secured to said table, each of said levers comprising a long substantially horizontal arm to the end of which is pivotally attached a slip, and a short substantially vertical arm, a platform adapted to be displaced vertically above said table, tongs supported by said platform for making and breaking the joints of pipe string, means for raising and lowering said platform to bring it in operative relation with said vertical short arms of the bell-crank levers, whereby said levers are caused to swing and the slips are lifted out of their conical seat when said platform is lowered, and a central aperture provided in said platform to receive the slips in their lifted positions.

2. In an automatic slip control appliance of drill-pipe strings for sounding holes, a combination comprising a rotary table with a central aperture for the passage of said pipe string and a conical seat arranged coaxilly thereto to receive said drill-pipe string, a plurality of slips disposed around said string and lodged within said conical seat, bell-crank levers to support said slips and having their bends pivotally secured to said table, each of said levers comprising a long substantially horizontal arm to the end of which is pivotally attached a slip, and a short substantially vertical arm, a contact cushion provided at the outer end of each of said short vertical arms by means of a spring loaded pivotal attachment, a tongs carrying platform adapted to be displaced vertically above said table, means for raising and lowering said platform, a plurality of recesses provided on the under face of said platform to engage the said cushions pivoted on the bell crank levers, whereby said levers are caused to swing and the slips are lifted out of their conical seat when said platform is lowered, and a central aperture provided in said platform to receive the slips in their lifted position.

VLADIMIR EDELBERG.

References Cited in the file of this patent

UNITED STATES PATENTS

| Number | Name | Date |
|---|---|---|
| 1,111,535 | Greve | Sept. 22, 1914 |
| 1,517,979 | Greathouse | Dec. 2, 1924 |
| 1,685,284 | Harding | Sept. 25, 1928 |
| 2,263,267 | Franklin | Nov. 18, 1941 |
| 2,545,627 | Moore | Mar. 20, 1951 |